US009509234B2

United States Patent
Bauer et al.

(10) Patent No.: US 9,509,234 B2
(45) Date of Patent: Nov. 29, 2016

(54) METHOD FOR OPERATING A DRIVE CONTROL DEVICE, FACILITY WITH MEANS FOR EXECUTING THE METHOD AND DRIVE CONTROL DEVICE WITH SUCH A FACILITY

(71) Applicant: Siemens Aktiengesellschaft, München (DE)

(72) Inventors: Franz Bauer, Herzogenaurach (DE); Hubert Schierling, Erlangen (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 304 days.

(21) Appl. No.: 14/305,667

(22) Filed: Jun. 16, 2014

(65) Prior Publication Data
US 2014/0369091 A1 Dec. 18, 2014

(30) Foreign Application Priority Data

Jun. 17, 2013 (EP) .................................... 13172257

(51) Int. Cl.
*H02M 1/12* (2006.01)
*H02M 7/5387* (2007.01)
*H02P 29/00* (2016.01)

(52) U.S. Cl.
CPC .......... *H02M 7/53875* (2013.01); *H02P 21/22* (2016.02); *H02P 29/0038* (2013.01); *H02M 2007/53876* (2013.01)

(58) Field of Classification Search
CPC .......... H02P 29/0038; H02P 21/0035; H02M 2007/53876; H02M 7/53875
USPC ............................................................ 363/44
See application file for complete search history.

(56) References Cited

U.S. PATENT DOCUMENTS 6,760,239 B2    7/2004   Schierling
6,850,424 B2    2/2005   Baudelot
(Continued)

FOREIGN PATENT DOCUMENTS

CN    1314745 A      9/2001
CN    102624322 A    8/2012
CN    102629768 A    8/2012

OTHER PUBLICATIONS

Direct Self-Control and Synchronous Pulse Techniques for High-Power Traction Inverters in Comparison; Andreas Steimel: "Direct Self-Control and Synchronous Pulse Techniques for High-Power Traction Inverters in Comparison", IEEE Transactions on Industrail Electronics, Piscataway, USA, vol. 51, No. 4, Aug. 1, 2004, pp. 810-820, XP011115702.

*Primary Examiner* — Adolf Berhane
*Assistant Examiner* — Afework Demisse
(74) *Attorney, Agent, or Firm* — Henry M. Feiereisen LLC.

(57) ABSTRACT

A drive controller and a method for operating a drive controller having a converter with a DC link circuit, includes measuring during operation phase currents generated by the converter; forming from the measured phase currents a current vector in a first coordinate system; rotating, with a first transformation angle and with a first rate of change, the current vector into a second coordinate system to generate a resulting current vector; supplying the resulting current vector to a regulator to generate a resulting voltage vector at an output of the regulator; rotating, with the first transformation angle or with a second transformation angle rotating at the first rate of change, the resulting voltage vector back into the first coordinate system to generate a resulting back-transformed voltage vector; and using the resulting back-transformed voltage vector as an influencing variable in addition to U/f control or vector regulation for controlling the converter.

12 Claims, 6 Drawing Sheets

(56) References Cited

U.S. PATENT DOCUMENTS

| | | |
|---|---|---|
| 6,862,163 B2 | 3/2005 | Schierling |
| 6,914,397 B2 | 7/2005 | Schierling |
| 7,301,736 B2 | 11/2007 | Schierling |
| 7,394,627 B2 | 7/2008 | Bruckmann |
| 7,489,124 B2 | 2/2009 | Schierling |
| 7,529,111 B2 | 5/2009 | Schierling |
| 7,622,886 B2 | 11/2009 | Schierling |
| 7,652,585 B2 | 1/2010 | Schierling |
| 7,825,533 B2 | 11/2010 | Schierling |
| 7,948,779 B2 | 5/2011 | Bauer |
| 2003/0058662 A1 | 3/2003 | Baudelot et al. |
| 2003/0155874 A1 | 8/2003 | Schierling |
| 2003/0202369 A1 | 10/2003 | Schierling et al. |
| 2004/0150266 A1 | 8/2004 | Schierling |
| 2004/0151119 A1 | 8/2004 | Schierling et al. |
| 2005/0067906 A1 | 3/2005 | Schierling et al. |
| 2006/0056212 A1 | 3/2006 | Schierling |
| 2007/0053213 A1 | 3/2007 | Brune et al. |
| 2007/0177407 A1 | 8/2007 | Bruckmann et al. |
| 2007/0242491 A1 | 10/2007 | Schierling |
| 2008/0191356 A1 | 8/2008 | Leibold et al. |
| 2008/0272727 A1 | 11/2008 | Schierling |
| 2008/0272924 A1 | 11/2008 | Schierling |
| 2008/0309158 A1 | 12/2008 | Schierling |
| 2008/0310202 A1 | 12/2008 | Schierling |
| 2010/0027302 A1 | 2/2010 | Bauer et al. |
| 2011/0043082 A1 | 2/2011 | Billmann et al. |
| 2012/0211299 A1* | 8/2012 | Yanai ............... B62D 5/046 180/446 |

* cited by examiner

METHOD FOR OPERATING A DRIVE CONTROL DEVICE, FACILITY WITH MEANS FOR EXECUTING THE METHOD AND DRIVE CONTROL DEVICE WITH SUCH A FACILITY

CROSS-REFERENCES TO RELATED APPLICATIONS

This application claims the priority of European Patent Application, Serial No. 13172257.1, filed Jun. 17, 2013, pursuant to 35 U.S.C. 119(a)-(d), the content of which is incorporated herein by reference in its entirety as if fully set forth herein.

BACKGROUND OF THE INVENTION

The present invention relates to a method for operating a drive control device, a facility with means for executing the method and a drive control device with such a facility.

The following discussion of related art is provided to assist the reader in understanding the advantages of the invention, and is not to be construed as an admission that this related art is prior art to this invention.

In many applications, for a converter drive with a DC link circuit, referred to here and below in general terms as a drive control device, because of so-called harmonics a DC link ripple voltage arises. If for example the DC link circuit is fed from an uncontrolled diode bridge from the three-phase alternating current network, the DC link circuit voltage is periodically stationary and contains the multiples of six times the network supply frequency. In addition, for unsymmetrical networks further harmonics (e.g. twice the network supply frequency) can also be contained therein.

A ripple in the DC link circuit voltage generates subharmonics in the motor voltage and in the motor current depending on the output frequency of a pulse converter when the influence of the DC link voltage cannot be compensated for by the activation method. This is the case for example during an overload or during a non-ideal compensation by temporal delay of the voltage measurement. Especially critical are output frequencies in which the frequency of the subharmonics arising is small or even becomes a zero-frequency quantity. In this case the voltage harmonics generate high harmonic content in the output currents which have a negative effect on the regulation, the quality of the torque and the load on the inverter.

Previously the problem of undesired subharmonics was solved by the degree of control for critical output frequencies being reduced far enough for a majority of the subharmonics to be able to be avoided by compensation of the DC link circuit voltage. This leads however to a lower utilization of the converter, since in these ranges the maximum output voltage is no longer available. In addition it is not optimal with previous approaches that with a non-ideal compensation of the DC link circuit voltage, subharmonic content which has to be taken into account still remains in the linear range of the modulator.

It would therefore be desirable and advantageous to provide an improved method and a facility to obviate prior art shortcomings and to make it possible to reduce the undesired subharmonics.

SUMMARY OF THE INVENTION

According to one aspect of the present invention, a method for operating a drive control device having a converter with a DC link circuit includes measuring phase currents generated during operation of the converter either continuously or at suitable sampling time intervals or even as averages over suitable time intervals. From the phase currents a current vector ($\underline{i}_{\alpha\beta}$) is formed in a first coordinate system ($\alpha$-$\beta$ coordinate system). The current vector ($\underline{i}_{\alpha\beta}$) is rotated, especially by means of a first vector rotator, by a transformation angle ($\phi_{fSH}$) into a second coordinate system (x-y coordinate system). A current vector ($\underline{i}_{xy}$) resulting after the rotation in the second coordinate system is supplied to a regulator. A voltage vector ($\underline{du}_{xy}$) resulting at the output of the regulator is rotated, especially by using a second vector rotator, by a transformation angle ($\phi_{fSH}$) with the same rate of change, back into the first coordinate system. Finally the resulting voltage vector ($\underline{du}_{\alpha\beta}$) is used in the first coordinate system as an influencing variable in addition to a U/f control or vector regulation for controlling the converter.

The effect of the rotation of the current vector ($\underline{i}_{\alpha\beta}$) initially present in the first coordinate system by the transformation angle ($\phi_{fSH}$) into the second coordinate system is that in the resulting current vector ($\underline{i}_{xy}$) in the second coordinate system—more precisely in the time curve of the resulting current vector ($\underline{i}_{xy}(t)$)—the subharmonics occurring become zero-frequency quantities. Such zero-frequency quantities can be easily be regulated out with a regulator.

The rotation back into the first coordinate system can be done with the same transformation angle ($\phi_{fSH}$) with which the current vector ($\underline{i}_{\alpha\beta}$) was previously rotated into the second coordinate system. The transformation angle of the subsequent rotation can, however, differ from the previously used transformation angle ($\phi_{fSH}$) by a constant. The significant factor is the same rate of change of the transformation angle. An equal rate of change is synonymous with an equal transformation frequency.

Thus, to avoid the subharmonics, a regulation is proposed which largely regulates out the subharmonics. The method can be employed together with U/f controls and together with field-oriented regulation methods. The regulation in such cases operates with variables which, as a result of a transformation angle ($\phi_{fSH}$) predetermined or defined as part of the method, are subjected to a rotation from a first coordinate system into a second coordinate system and finally from the second coordinate system back into the first coordinate system. The effect of the double rotation is that the regulation can work with variables in the second coordinate system in which the subharmonic to be regulated out occurs as a zero-frequency quantity.

According to another aspect of the present invention, a facility is configured to operate in accordance with the aforedescribed method. For this purpose, the facility includes a regulator having an input and an output, a first vector rotator connected upstream of the regulator and receiving in a first coordinate system a current vector formed from measured phase currents generated by the converter during operation, said first vector rotator configured to rotate the current vector in the first coordinate system into the second coordinate system with a first transformation angle with a first rate of change and supplying the rotated current vector to the input of the regulator, and a second vector rotator connected downstream of the regulator and receiving from the regulator a resulting voltage vector, said second vector rotator configured to rotate the resulting voltage vector back into the first coordinate system to generate a resulting back-transformed voltage vector. The first transformation angle is identical to the second transformation angle and/or the second transformation angle rotates with the first rate of change of the first transformation angle.

The said invention is based on the knowledge that modulation products arise in the output voltage (motor voltage) through a variable DC link voltage in the overload range. The modulation products in the output voltage have the following frequencies:

$$f_{SH} = f_{ZK} \pm v \cdot f$$

In this equation f is the predetermined or predeterminable fundamental frequency of the output voltage, which will be also just referred to below by such abbreviated terms as output frequency, operating frequency or motor frequency, $f_{ZK}$ is the frequency of the ripple in the DC link circuit voltage and v is an odd whole number not divisible by three.

If for example, as already mentioned above, a supply of the DC link circuit via a diode bridge is considered, then with a symmetrical network a stationary DC link voltage arises, which contains the multiples of six-times the network supply frequency:

$$f_{ZK} = 6 \cdot \mu \cdot f_N,$$

wherein $f_N$ is the network supply frequency (network frequency) and μ is a natural number (μ=[1, 2, 3, . . . ]).

This produces the frequencies of the modulation products at the converter output:

$$f_{SH} = 6 \cdot \mu \cdot f_N \pm v \cdot f \quad (1)$$

The approach presented here is based on one subharmonic being regulated out with the aid of the regulator in each case or a number of subharmonics being regulated out with a corresponding multiple of such regulators, which acts or act in addition to an existing U/f control or vector regulation: From the measured stator currents additional target voltages are generated which regulate away the undesired subharmonic components in the currents. The regulation in such cases operates in a coordinate system which rotates with a frequency of the subharmonics to be regulated out (problematic frequency). In this coordinate system the subharmonics arising become zero-frequency quantities, which in an advantageous manner are able to be regulated out with a regulator, especially a regulator which has an I component.

For each combination of network supply frequency $f_N$ and output frequency f in accordance with the relationship in equation (1), a plurality of frequencies belong to the subharmonics $f_{SH}$ arising. However, it is not necessary for each of the modulation frequencies $f_{SH}$ to have an active regulation. Instead it has transpired that it is sufficient to restrict the regulation to individual modulation frequencies $f_{SH}$ with critical harmonic orders. Critical are those subharmonic frequencies $f_{SH}$ for which the amplitude of the modulation products arising is large and the frequency is small. These types of subharmonic frequencies $f_{SH}$ essentially occur at very high levels of control, which is manifested above all in the field attenuation. Especially critical is the combination μ=1 and v=−5 (positive output frequency f). Here, for a network feed frequency $f_N$=50 Hz and an output frequency f=60 Hz, the frequency of the subharmonics $f_{SH}$ is almost 0 and the amplitude is significant.

According to an advantageous feature of the present invention, the transformation angle ($\phi_{fSH}$) may be determined based on a critical subharmonic frequency ($f_{SH}$). The execution of the method then has the advantageous effect that precisely the respective predetermined critical subharmonic frequency ($f_{SH}$) is regulated out. A critical subharmonic frequency ($f_{SH}$) is to be understood, in accordance with the information given above, as a subharmonic frequency with a not insignificant and thereby disruptive amplitude of the modulation products.

According to another advantageous feature of the present invention, in which the transformation angle ($\phi_{fSH}$) is determined based on the critical subharmonic frequency ($f_{SH}$), the transformation angle ($\phi_{fSH}$) may be determined based on a critical subharmonic frequency ($f_{SH}$), wherein the transformation angle ($\phi_{fSH}$) is determined on the one hand based on a frequency of a harmonic of a voltage in the DC voltage link circuit—DC link voltage—and on the other hand based on the frequency of a harmonic of an output voltage of the converter. The determination of the critical subharmonic frequency ($f_{SH}$) is then based on the equation (1) described above and, for execution of the method, the critical subharmonic frequency ($f_{SH}$) thus predetermined is regulated out.

The above-mentioned object is also achieved with a facility, namely a drive control device of a converter drive with DC link circuit or a drive control device containing such a facility, which operates in accordance with the method as described here and below and for this purpose includes devices or programs configured to execute the method. In this case, the invention is implemented either in hardware, firmware or software or combinations thereof. Where the invention is implemented in software, said method is on the one hand also a computer program with program code instructions able to be executed by a computer and on the other hand a storage medium with such a computer program, i.e. a computer program product with the program code means, and ultimately also a drive control device or a drive system in which or in the memory of which, as means for executing the method and its embodiments, such a computer program is loaded or is able to be loaded.

The above-mentioned facility with means for executing the method or individual embodiments of the method includes, as means for rotating the current vector ($\underline{i}_{\alpha\beta}$) in the first coordinate system into the second coordinate system, a first vector rotator connected upstream of the regulator, as well as, as means for rotating the voltage vector ($d\underline{u}_{xy}$) in the second coordinate system into the first coordinate system, a second vector rotator connected downstream from the regulator, wherein the first vector rotator is able to be supplied with the transformation angle ($\phi_{fSH}$) determining the scope of rotation of the respective vector and the second vector rotator is able to be supplied with the same transformation angle ($\phi_{fSH}$) or with a transformation angle rotating at the same rate of change of the transformation angle ($\phi_{fSH}$). For example, a functionality implemented in software and/or firmware is considered as a vector rotator, which by means of a parameterizable so-called rotation matrix, effects a rotation of a vector. Such a vector rotator thus processes two input variables or two input signals, namely on the one hand the vector to be rotated and on the other hand the angle used in the parameterization of the rotation matrix, i.e. the transformation angle ($\phi_{fSH}$).

According to another advantageous feature of the present invention, the facility is configured so as to effect by means of the first vector rotator a backwards rotation of the current vector ($\underline{i}_{\alpha\beta}$) by the transformation angle ($\phi_{fSH}$) into the second coordinate system and by means of the second vector rotator a forwards rotation of the voltage vector ($d\underline{u}_{xy}$) by a transformation angle rotating at the same rate of change, especially a forwards rotation by the same transformation angle ($\phi_{fSH}$) back into the first coordinate system. The effect of the backwards rotation and the subsequent forwards rotation, especially the backwards rotation and the subsequent forwards rotation by the same transformation angle ($\phi_{fSH}$), is that the output of the regulator is finally available again in the original coordinate system (reference system) and thus the output of the regulator is able to be used for controlling the converter.

According to another advantageous feature of the present invention, the facility may include a regulator having an integrating component, for example a PI regulator or a PID regulator. A regulator which has an integrating component is known to advantageously eliminate any lasting regulation deviation.

According to another additional or alternative advantageous feature of the present invention, the transformation angle ($\phi_{fSH}$) may be generated from the critical subharmonic frequency ($f_{SH}$) by at least one integrator. This is a simple and efficient option to continuously or constantly form the transformation angle ($\phi_{fSH}$) during operation of the facility. Advantageously, the facility may include a first integrator to which a respective output frequency (f) may be supplied, and a second integrator, to which a predetermined or predeterminable multiple of a network frequency ($f_N$) may be supplied, wherein an output of the first integrator is routed via a multiplication point and an output of the second integrator is routed to a summation point. An angle progressing with the respective frequency is determined with the two integrators. By using the multiplication point and the summation point, based on the equation (1) described above and the processed frequencies, an angle progressing with the respective selected critical subharmonic frequency ($f_{SH}$), namely the transformation angle ($\phi_{fSH}$), is automatically determined.

According to another advantageous feature of the present invention, the facility may also include a zero-frequency regulator with the first vector rotator, the regulator and the second vector rotator, wherein the zero-frequency regulator also includes a filter connected upstream of the first vector rotator, especially a filter in the form of a notch filter. The frequencies, which otherwise could lead to a distortion of an operating point of a control of the converter, can be eliminated with such a filter.

The approach presented here enables subharmonics in the output voltages (motor voltages) and currents to be avoided for ripple DC link circuit voltages at critical output frequencies, especially in the overload range. In these ranges this allows an improvement in the torque quality and also in the converter loading and allows a greater converter utilization. Thus the demand for an output voltage corresponding to the input voltage with diode supply in the critical frequency ranges without destructive subharmonics is also able to be realized.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 5 shows a graph of the phase currents before and after a zero frequency regulation effected with the apparatus in FIG. 1 is switched in.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
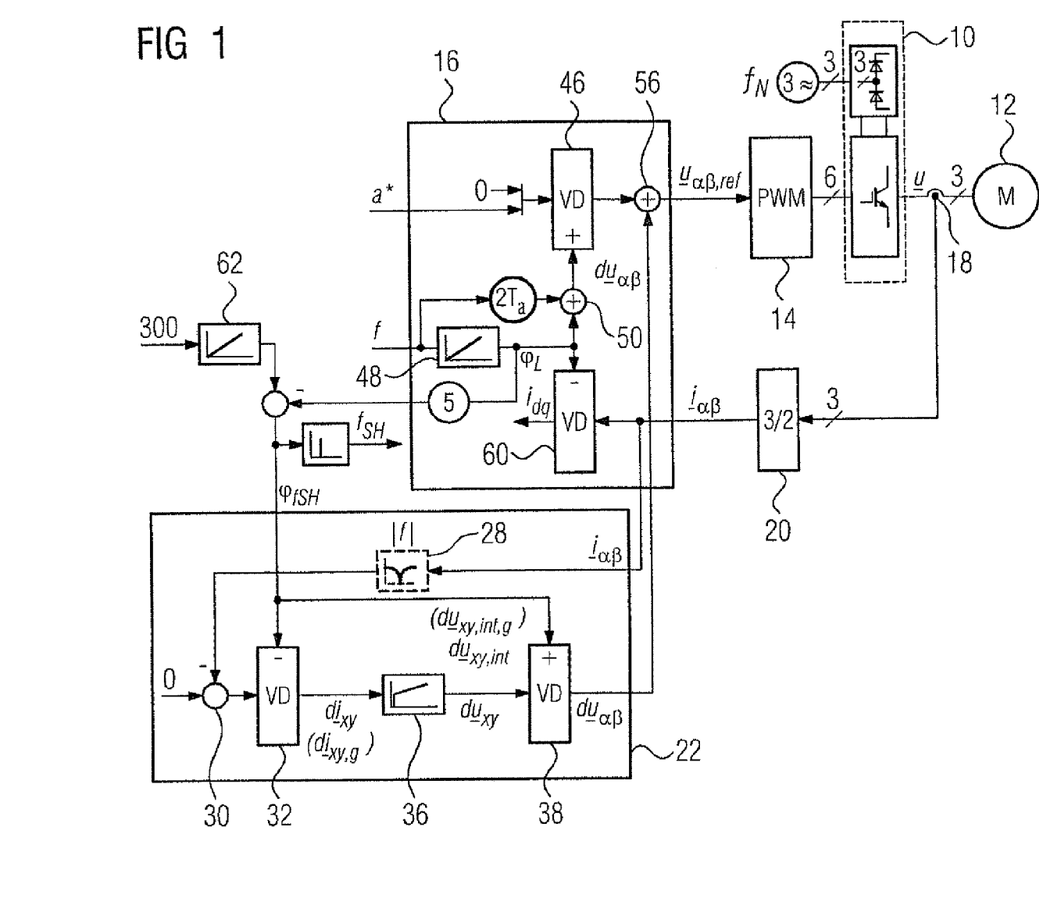
FIG. 1 shows a block diagram of an embodiment for a facility for regulating out subharmonics with a zero-frequency regulator and a control device according to the present invention.

Turning now to the drawing, and in particular to FIG. 1, there is shown for the case of U/f control, a block diagram of an embodiment for regulating out subharmonics with the critical harmonic orders mentioned above. The principle underlying the block diagram can of course also be used for other harmonic orders (v=−7, 11, 13, . . . ).

On the far right the block diagram shows a motor 12 driven by means of the converter 10 as an example of a load. The converter 10, in a manner known per se, includes an input current converter (rectifier) only shown as a simplified schematic and an output converter (AC converter; pulse converter) also only shown as a simplified schematic. The converter 10 is supplied from a power supply network (a three-phase network is shown as the power supply network) with an input voltage with a respective power feed frequency $f_N$ (for example $f_N$=50 Hz). The input current converter and the output current converter are linked, in a manner known per se, via a DC link circuit (not shown).

The activation of the semiconductor switches included in the output current converter is undertaken in the manner known per se by means of a pulse width modulator 14. This is presented by means of a control device 16, which for example realizes a so-called U/f control known per se or a field-oriented regulation/vector regulation or the like, with a voltage reference command ($\underline{u}_{\alpha\beta ref}$). The voltage reference command $\underline{u}_{60 \beta,ref}$ is a vector in the components α and β. The pulse width modulator 14 generates six activation signals therefrom for the output current converter of the converter 10.

To regulate out undesired subharmonics in the output voltage and in the motor current resulting therefrom a current measurement is made by means of a transducer 18. The three phase currents $i_u$, $i_v$ and $i_w$ of the motor 12 are measured. By means of a 3/2 transformer 20, which carries out a known 3/2 transformation (also referred to in technical terminology as D/q-transformation), the three-phase motor current is transformed into a two-axis coordinate system with the components α and β and at the output of the 3/2 transformer 20 a vector for the motor currents is produced in the components α and β: $\underline{i}_{\alpha\beta}$. This is supplied to a zero-frequency regulator 22, by means of which the undesired subharmonics are regulated out.

Figure 2:
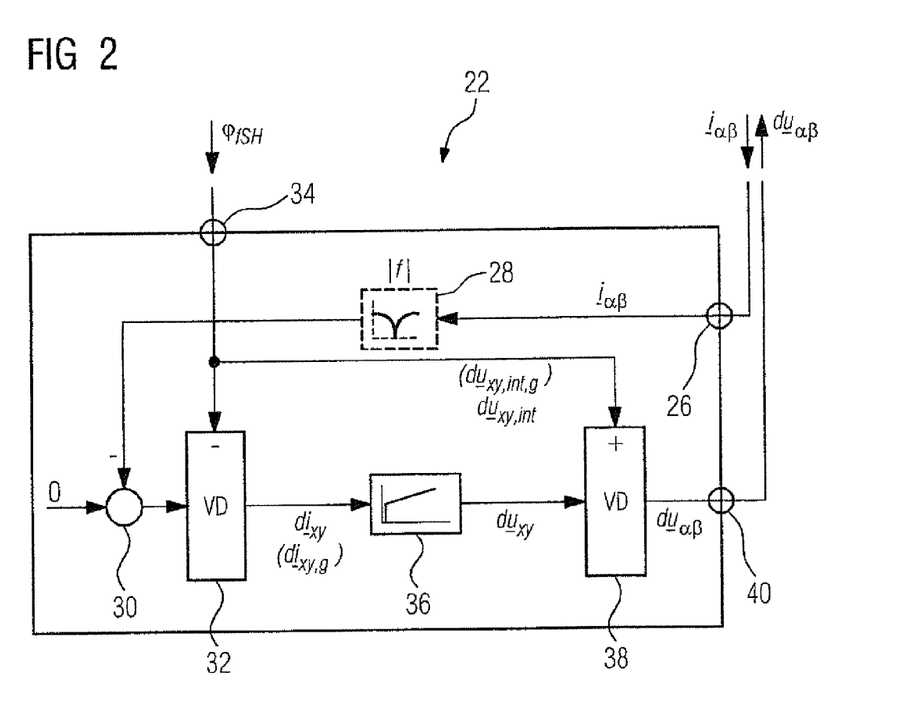
FIG. 2 shows a section of the block diagram according to FIG. 1 with the zero-frequency regulator.

The diagram in FIG. 2 shows an enlarged view of the zero-frequency regulator 22 according to FIG. 1. The zero-frequency regulator 22 is supplied at a first input 26 with the vector for the motor current ($\underline{i}_{\alpha\beta}$) expressed in the components α and β. A frequency filtering is undertaken by means of an optional filter, especially a filter in the form of a notch filter 28. The notch filter 28 is tuned in this case for example to the basic frequency of the output voltage (output frequency) f. The option is provided, by means of the optional notch filter 28 to filter out the fundamental oscillation in the measured current ($\underline{i}_{\alpha\beta}$), i.e. the respective output/motor frequency. This prevents the zero frequency control affected via the zero-frequency regulator 22 being able to result in a displacement of an operating point of the control device 16.

For a vector regulation the reference currents are generally known. As an alternative to a filter they can be derived from the actual currents (measured phase currents $i_u$, $i_v$ and $i_w$ or motor current vector $\underline{i}_{\alpha\beta}$). The basic oscillation of the differential current supplied to the zero-frequency regulator 22 then become zero so that even in this case the operating point remains uninfluenced by the regulation.

Regardless of whether and how a frequency filtering has been carried out, the motor current vector ($\underline{i}_{\alpha\beta}$) is subsequently inverted, in the exemplary embodiment shown by means of a summation point 30 and a subtraction at this point of the motor current vector ($\underline{i}_{\alpha\beta}$). The inverted motor current vector ($-\underline{i}_{\alpha\beta}$) is then supplied to a first vector rotator 32 of the zero frequency regulator 22. The angle ($\phi_{fSH}$) by which the first vector rotator 32 rotates the motor current vector ($-\underline{i}_{\alpha\beta}$) is then fed to the zero-frequency regulator 22 at a second input 34. This is produced as a result of one of the critical subharmonic frequencies $f_{SH}$ described above.

The determination of this angle will be explained below. First of all it is essential that the first vector rotator 32 rotates the motor current vector ($-\underline{i}_{\alpha\beta}$) backwards by a predetermined angle in each case, as is made clear by the minus sign at the relevant input of the first vector rotator 32. The motor current vector ($-\underline{i}_{\alpha\beta}$) is thus rotated in a coordinate system which rotates at one of the critical subharmonic frequencies and the motor current is produced as a vector in the components x and y: $\underline{di}_{xy}$.

The current vector ($\underline{di}_{xy}$) thus transformed is then fed to a regulator 36, namely a PI regulator or generally a regulator, having at least one integral component. It is known that a regulator with an integral component is capable of completely regulating out a regulation deviation and the transformed current vector ($\underline{di}_{xy}$) is fed to the regulator 36 at its input as a regulation deviation. The regulator 36 is designed and parameterized so that said regulator brings about a regulating out of the undesired subharmonics. As a result of the integration a vector for the additional reference voltage for the motor 12 in the components x and y is produced at the output of the regulator 36, i.e. in the coordinate system: $\underline{du}_{xy}$ rotating with one of the critical subharmonic frequencies.

With a second vector rotator 38 of the zero-frequency regulator 22 the vector for the additional reference voltage ($\underline{du}_{xy}$) is rotated again into the αβ coordinate system. For this purpose the second vector rotator 38 uses the same angle of rotation by which the first vector rotator 32 had previously rotated back the motor current vector ($-\underline{di}_{\alpha\beta}$). The second vector rotator 38 accordingly affects a forwards rotation—also symbolically represented by the plus sign—of the motor voltage vector supplied at the input ($\underline{du}_{xy}$) and at the output of the second vector rotator 38 and as an output variable of the zero-frequency regulator 22 overall a vector for the motor voltage (additional target voltage) in the components α and β: $\underline{du}_{\alpha\beta}$ is produced at its output 40.

The resulting motor voltage vector ($\underline{u}_{\alpha\beta}$) is added to an output signal generated by the control device 16 as an additional reference voltage. For a further explanation in this regard a description of the functionality of the control device 16 is now provided first of all for the typical situation of a U/f control realized there.

Figure 3:
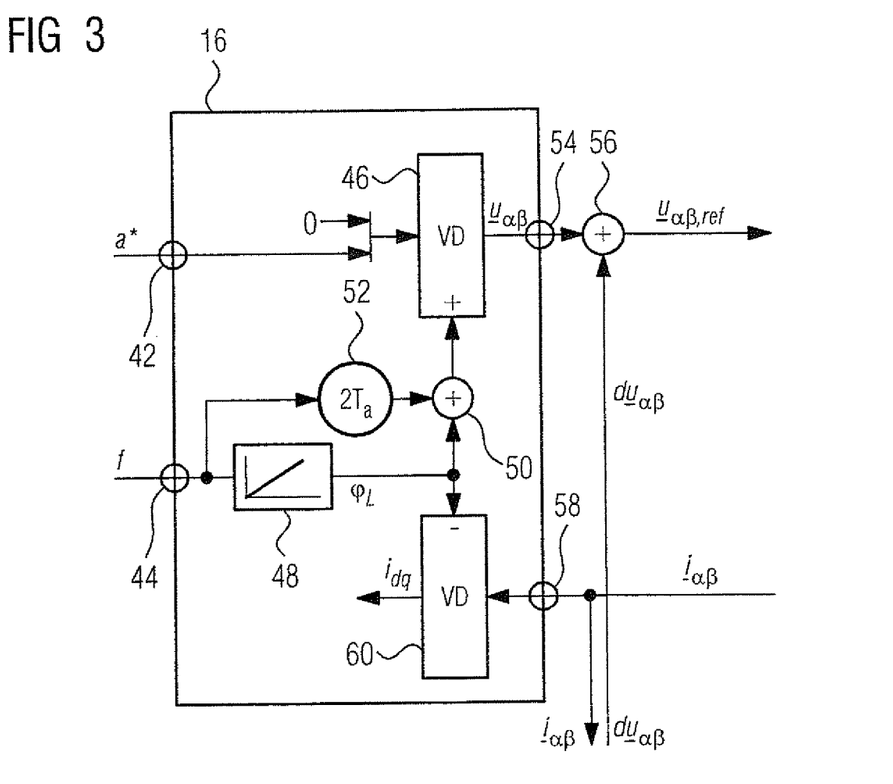
FIG. 3 shows a section of the block diagram according to FIG. 1 with the control device.

To this end the diagram in FIG. 3 shows an enlarged view of the control device 16 in accordance with FIG. 1. At a first input 42 a reference control value (a*) and thus a second input 44 a respective output frequency f, i.e, the desired basic frequency of the output voltage in each case are specified to said device. The scalar reference control value (a*) is converted into a vector, one of the components of which corresponds to the numerical value "0" and the other component of which corresponds to the reference control value (a*). The resulting vector is supplied to a third vector rotator 46 (first vector rotator of the control device 16). The angle by which the third vector rotator 46 rotates the vector resulting from the reference control value (a*) is produced from the output frequency f. For this purpose the control device 16 integrates the output frequency f predetermined at its second input 44 by means of an integrator 48. The progressive angle $\phi_L$ is produced. To this, at a summation point 50, is added a summand formed from a factor (multiplication point 52) with the output frequency f and predetermined or able to be predetermined based on a sample time $T_a$ and the value for the third vector rotator 46 is produced. Through the rotation (forwards rotation; "+") of the vector resulting from the reference control value (a*) by this angle, a vector in the components α and β: $\underline{u}_{\alpha\beta}$ is produced at the output of the third vector rotator 46 and thus at the output 54 of the control device 16 as a whole as a reference voltage value command for the pulse width modulator 14 (FIG. 1).

Disposed downstream of the output of the third vector rotator 46 is a fourth summation point 56 (here shown adjacent to output 54, but also possibly able to be realized as an element of control device 16). Here the voltage reference value command ($\underline{u}_{\alpha\beta}$) and the additional reference voltage ($\underline{du}_{\alpha\beta}$) are added: $\underline{u}_{\alpha\beta}+\underline{du}_{\alpha\beta}=\underline{u}_{\alpha\beta,ref}$. Based on the resulting voltage vector ($\underline{u}_{\alpha\beta,ref}$) the pulse width modulator 14 creates the control signals for the output current converter of the converter 10. The additive consideration of the additional reference voltages ($\underline{du}_{\alpha\beta}$) emanating from the zero frequency regulator 22 causes an adapted target voltage value command $\underline{u}_{\alpha\beta,ref}$ for the pulse width modulator 14. The effect resulting from this is the desired avoidance of the critical subharmonics, here the critical subharmonics with the harmonic orders μ=1 and ν=−5.

Also shown in the figure is that—without any function however in conjunction with the approach described here—the control device 16 is also supplied at a third input 58 with the motor current vector ($\underline{i}_{\alpha\beta}$) arising as a result of the measurement of the phase currents $i_u$, $i_v$ and $i_w$ of the motor 12 following the 3/2 conversion 20 (FIG. 1). This motor current vector ($\underline{i}_{\alpha\beta}$) is, as already explained in conjunction with FIG. 2, supplied to the zero-frequency regulator 22 and further processed there. Within the control device 16 from the motor current vector ($\underline{i}_{\alpha\beta}$) in the component α and β by means of a fourth vector rotator 60 (second vector rotator of the control device 16) by backwards rotation—also symbolically represented by the minus sign—by the angle $\phi_L$ of the motor current vector ($\underline{i}_{dq}$) resulting from the output frequency f in the components d and q, i.e. in the coordinate system of the stator flux.

Figure 4:
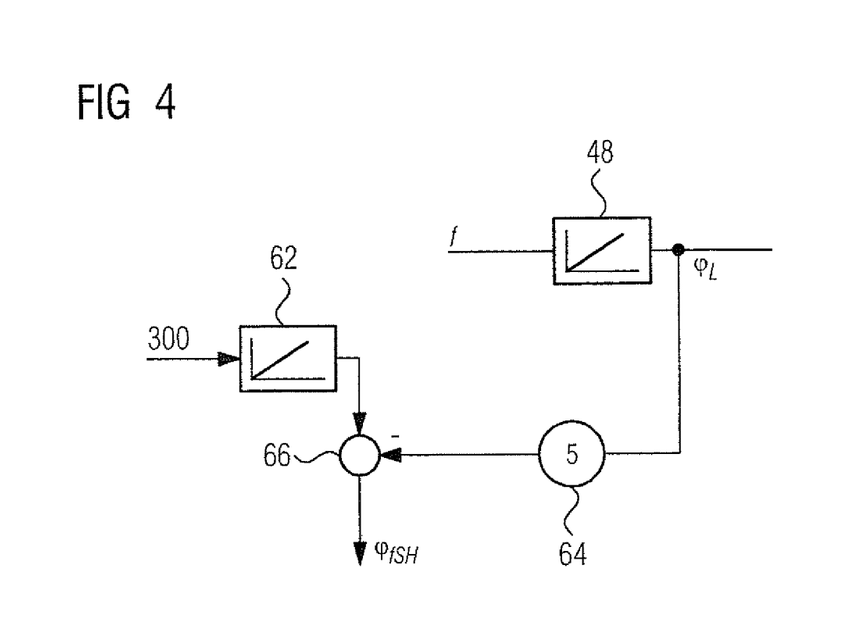
FIG. 4 shows a section of the block diagram according to FIG. 1 with the functionality for determining an angle from a critical subharmonic frequency.

The generation of the angle used for the zero-frequency regulator 22 and its vector rotator 32, 38 because of one of the critical subharmonic frequencies $f_{SH}$ described at the start now remains to be explained. For this purpose the diagram in FIG. 4 shows a section from the block diagram in FIG. 1 with the components relevant in this regard.

In conjunction with the diagram in FIG. 3 it has already been explained that the progressive angle $\phi_L$ is produced from the output frequency f by integration (integrator 48/first integrator 48). A corresponding progressive angle is produced by integration (second integrator 62) from the frequency of the first ($\mu$=1) harmonic of the DC link voltage: $f_{ZK}$=6 $\mu f_N$=6×50 Hz=300 Hz (the numerical value "300" shown in the input of the second integrator 62 is based on this). This angle and also the angle ($\phi_L$) based on the output frequency f and multiplied by predetermined or predeterminable factor, here "5", at a multiplication point 64, are subtracted at a summation point 66 and the angle $\phi_{fSH}$ used in the zero-frequency regulator 22 is produced. The block diagram in FIG. 4 is accordingly thus an implementation of a determination of a progressive angle based on one of the critical subharmonic frequencies ($\mu$=1, v=−5) and to this extent an implementation of the equation (1) mentioned at the start: $f_{SH}$=6 $\mu f_N$±v f for $\mu$=1 and v=−5, so that $\phi_{fSH}$=∫300 Hz dt−5∫f dt=∫(300 Hz−5 f) dt=∫f$_{SH}$ dt. Precisely as the integral symbol can be pushed through in the preceding relationship, in the block diagram too the location of the integration can be pushed through, so that the generation of the transformation angle ($\phi_{fSH}$) is also possible with an integrator. The block diagram in FIG. 4 is in any event an option for realizing a generation of the transformation angle ($\phi_{fSH}$) from the critical subharmonic frequency (f$_{SH}$) by means of at least one integrator 48, 62, here the first and the second integrator 48, 62.

The progressive angle ($\phi_{fSH}$) thus determined is—as has already been described above—used in the zero-frequency regulator 22 in order to rotate the current and voltage vector ($\underline{i}_{\alpha\beta}$) or ($d\underline{u}_{xy}$) backwards first and later by the same angular value forwards. Thus after the first rotation (first vector rotator 32) initially a rotated current vector ($d\underline{i}_{xy}$), which rotates with the critical subharmonic frequency (f$_{SH}$) in each case, is produced. For regulating out the resulting zero-frequency values, this is supplied to a regulator 36. The voltage vector ($d\underline{u}_{xy}$) resulting at the output of the regulator 36 is then rotated back into the coordinate system of the original current vector ($\underline{i}_{\alpha\beta}$), so that the output of the zero-frequency regulator 22 can be processed together with the output of the control device 16 present in the same coordinate system.

Figure 5:
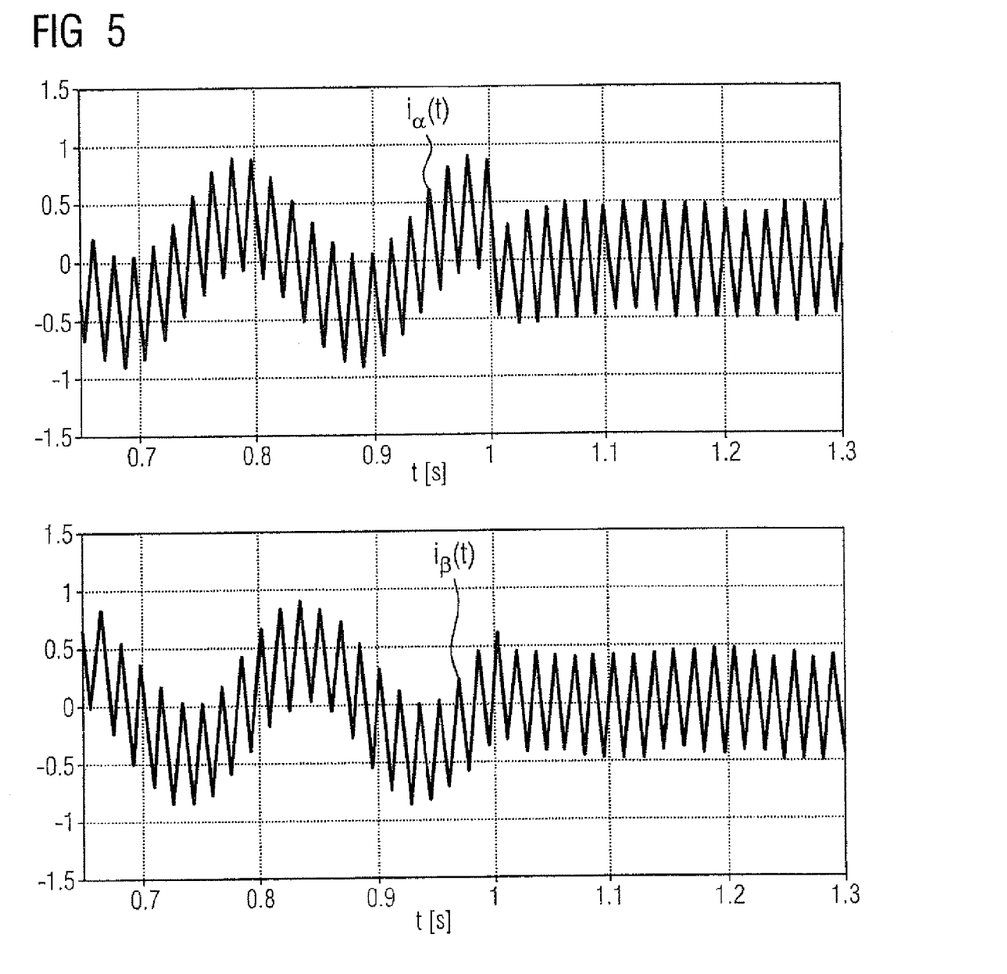

The diagram in FIG. 5 shows by way of example a result of the zero-frequency regulation thus achieved. The diagram shows the phase currents i$_\alpha$(t) and i$_\beta$(t) resulting during a U/f control in the overload in the components α and β on no load and at an output frequency f of 59 Hz. The time in seconds is plotted on the abscissas in each case. The diagram FIG. 5 is based on an activation of the zero-frequency regulation at approximately time t=1 s. The marked reduction achieved can readily be seen (actually largely an elimination) of the previous ripple of the phase currents i$_\alpha$(t) and i$_\beta$(t) as a result of undesired harmonics in the DC link voltage.

If there is not only a 300 Hz component, but a further component present in the DC link circuit voltage (for example a 600 Hz component, as is produced with a diode feed), a further regulation can be employed in parallel to the proposed regulation for this frequency in the same manner as explained above. The associated fundamental frequency of the output voltage (output frequency) would then lie at f=120 Hz. The harmonic orders $\mu$=2 and v=−5 accordingly belong to such a critical subharmonic. For other harmonic orders the multiplication point 64 (FIG. 4) is adapted accordingly and/or a further multiplication point (not shown) is added at the output of the integrator 62 (FIG. 4).

A simple option for deactivation of the zero-frequency regulator (from time to time) consists of the zero-frequency regulator 22 being deactivated by pulling together the regulator outputs. This is considered for example if it transpires that the amount of the output frequency differs sufficiently from 60 Hz.

Figure 6:
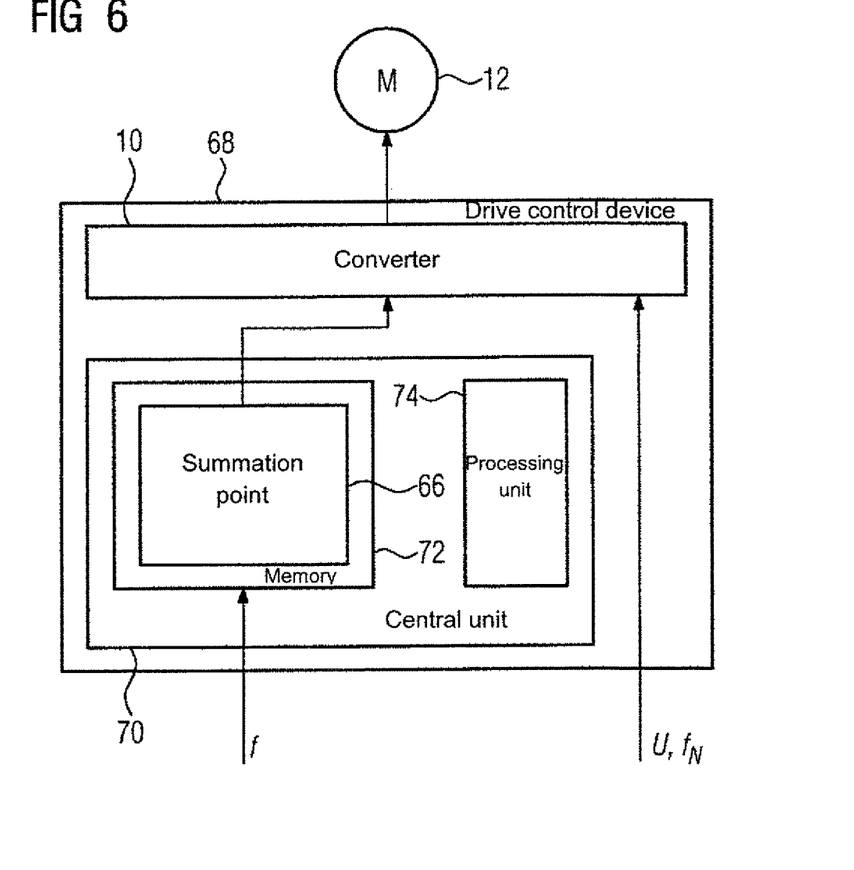
FIG. 6 shows a schematically simplified diagram of a drive control device realizing the functionality in accordance with FIG. 1.

The diagram in FIG. 6 finally shows a schematic of the simplified diagram of a drive control device 68 realizing the functionality in accordance with FIG. 1. This includes the converter 10, or the drive control device 68 is assigned to the converter 10 as a separate functional unit, especially in a modular arrangement. In any event the drive control device 68 includes a central unit 70 with a memory 72 and a processing unit 74 in the form of or by way of a microprocessor. Loaded into the memory 72 is a computer program 76, with which the functionality of the block diagram in FIG. 1 is implemented. The computer program 76 thus accordingly includes a respective software functionality for implementing the control device 16 (FIG. 1) and a software functionality for implementing the zero-frequency regulator 22 (FIG. 1) and the functional units included therein in each case, i.e. for example an implementation of a vector rotator 32, 38, 46, 60 and an implementation of a regulator 36. The implementation of the functionality of the block diagram in FIG. 1 in software in the form of a computer program 76 is however only one possible form of embodiment. An implementation in hardware or in hardware and firmware or in hardware, firmware and/or software may just as well be considered. The drive control device 68 is supplied with the respective mains voltage (U) with the respective mains frequency (f$_N$). Furthermore the respective desired output frequency (f) for the drive control device 68 is predetermined externally or stored as an operating parameter in the memory 72. Also stored as operating parameters in the memory 72 is the data for selecting the critical subharmonic frequency/frequencies (f$_{SH}$) to be regulated out in each case by means of the zero-frequency regulator 22 (FIG. 1; FIG. 3). Such data can directly specify the critical subharmonic frequency (f$_{SH}$) or include its underlying parameters, especially the harmonic orders $\mu$ and v, for example $\mu$=1 and v=−5. By means of the computer program 76, which can also include the functionality of the pulse width modulator 14 (FIG. 1), the converter 10 is activated and ultimately the motor 12 is activated.

The central unit 70 of the drive control device 68 is thus a facility with a processing unit 74 and a memory 72 into which a computer program 76 is loaded which, in operation of the drive control unit 68, is executed by said processing unit 74 and which implements an implementation of the method described here and where necessary individual forms of embodiment of the method. The central unit 70 is thus likewise an example for a facility with means for executing such a method.

Although the invention has been illustrated and described in greater detail by the exemplary embodiment, the invention is not restricted by the disclosed example or examples and other variations can be derived therefrom by the person skilled in the art, without departing from the scope of protection of the invention.

Individual major aspects of the description submitted here may thus be summarized as follows:

A method is specified for operating a drive control device 68 which includes a converter 10 with a DC link circuit and a facility operating in accordance with the method, wherein phase currents generated during operation by means of the converter 10 are measured, wherein from the measured phase currents, a current vector ($\underline{i}_{\alpha\beta}$) is formed in a first coordinate system (α-β coordinate system), wherein the current vector ($\underline{i}_{\alpha\beta}$) is rotated by a transformation angle ($\phi_{fSH}$) into a second coordinate system (x-y coordinate system), wherein a resulting current vector ($\underline{i}_{xy}$) is fed in the second coordinate system to a regulator 36, wherein a voltage vector ($d\underline{u}_{xy}$) resulting at the output of the regulator 36 is rotated back by the same transformation angle ($\phi_{fSH}$) or a transformation angle which is rotating at the same transformation speed, back into the first coordinate system and wherein the resulting voltage vector ($d\underline{u}_{\alpha\beta}$) is used in the first coordinate system as an additional influencing value for a U/f control or vector regulation for activation of the converter 10.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating a drive control device having a converter with a DC link circuit, including:
    measuring during operation phase currents generated by the converter,
    forming from the measured phase currents a current vector in a first coordinate system,
    rotating, with a first transformation angle and with a first rate of change, the current vector into a second coordinate system to generate a resulting current vector,
    supplying the resulting current vector to a regulator to generate a resulting voltage vector at an output of the regulator,
    rotating, with the first transformation angle or with a second transformation angle rotating at the first rate of change, the resulting voltage vector back into the first coordinate system to generate a resulting back-transformed voltage vector, and
    using the resulting back-transformed voltage vector as an influencing variable in addition to U/f control or vector regulation for controlling the converter.

2. The method of claim 1, wherein the transformation angle is determined based on a critical subharmonic frequency.

3. The method of claim 2, wherein the transformation angle is determined based on a frequency of a harmonic of a voltage in the DC link circuit and based on a frequency of a harmonic of an output voltage of the converter.

4. A facility for operating a drive control device having a converter with a DC link circuit, including:
    a regulator having an input and an output,
    a first vector rotator connected upstream of the regulator and receiving in a first coordinate system a current vector formed from measured phase currents generated by the converter during operation, said first vector rotator configured to rotate the current vector in the first coordinate system into the second coordinate system with a first transformation angle with a first rate of change and supplying the rotated current vector to the input of the regulator, and
    a second vector rotator connected downstream of the regulator and receiving from the regulator a resulting voltage vector, said second vector rotator configured to rotate the resulting voltage vector back into the first coordinate system to generate a resulting back-transformed voltage vector,
    wherein the first transformation angle is identical to the second transformation angle or the second transformation angle rotates with the first rate of change of the first transformation angle.

5. The facility of claim 4, wherein the first vector rotator is configured to rotate the current vector backwards into the second coordinate system by the first transformation angle, and wherein the second vector rotator is configured to rotate the voltage vector forwards into the first coordinate system by the first transformation angle or by the second transformation angle rotating at the first rate of change.

6. The facility of claim 4, wherein the regulator includes at least one integrating component.

7. The facility of claim 5, wherein the first transformation angle is generated from a critical subharmonic frequency by the at least one integrating component.

8. The facility of claim 7, wherein a first integrating component having an input receiving a basic output frequency and a second integrating component having an input receiving a predetermined multiple of a network frequency, and wherein an output of the first integrating component is connected via a multiplication circuit to a summation point and an output of the second integrating component is connected directly to the summation point.

9. The facility of claim 4, including a zero-frequency regulator which includes the first vector rotator, the regulator and the second vector rotator, and additionally a filter.

10. The facility of claim 9, wherein the filter is a notch filter.

11. A computer program embodied in a computer-readable non-transitory storage medium and including program code, which when loaded into a memory of a drive control device having a converter with a DC link circuit and executed on the drive control device, causes the drive control device to
    measure during operation phase currents generated by the converter,
    form from the measured phase currents a current vector in a first coordinate system,
    rotate, with a first transformation angle and with a first rate of change, the current vector into a second coordinate system to generate a resulting current vector,
    supply the resulting current vector to a regulator to generate a resulting voltage vector at an output of the regulator,
    rotate, with the first transformation angle or with a second transformation angle rotating at the first rate of change, the resulting voltage vector back into the first coordinate system to generate a resulting back-transformed voltage vector, and
    use the resulting back-transformed voltage vector as an influencing variable in addition to U/f control or vector regulation for controlling the converter.

12. A non-transitory computer-readable storage medium having stored thereon computer program code means which when loaded into a memory of a drive control device having a converter with a DC link circuit and executed on the drive control device, causes the drive control device to
    measure during operation phase currents generated by the converter,
    form from the measured phase currents a current vector in a first coordinate system, rotate, with a first transformation angle and with a first rate of change, the current vector into a second coordinate system to generate a resulting current vector, supply the resulting current vector to a regulator to generate a resulting voltage vector at an output of the regulator, rotate, with the first transformation angle or with a second transformation angle rotating at the first rate of change, the resulting voltage vector back into the first coordinate system to generate a resulting back-transformed voltage vector, and use the resulting back-transformed voltage vector as an influencing variable in addition to U/f control or vector regulation for controlling the converter.

* * * * *